March 11, 1969   K. P. HILLEGASS   3,432,007
DISC BRAKE WITH QUICK CHANGE LINING STRUCTURE
Filed July 25, 1967

INVENTOR.
KENNETH P. HILLEGASS
BY
Oldham & Oldham
ATTORNEYS

United States Patent Office 3,432,007
Patented Mar. 11, 1969

3,432,007
DISC BRAKE WITH QUICK CHANGE LINING STRUCTURE
Kenneth P. Hillegass, Copley, Ohio, assignor to The Goodyear Tire & Rubber Company, Akron, Ohio, a corporation of Ohio
Filed July 25, 1967, Ser. No. 655,783
U.S. Cl. 188—73       8 Claims
Int. Cl. F16d 55/00, 69/00

ABSTRACT OF THE DISCLOSURE

A disc brake which may have the linings replaced without dismantling or disconnecting the brake assembly. It includes a lining-back-plate subassembly for each friction lining not fastened to the actuating pistons. At each end of the back-plate is attached a removable guide plate that extends radially outwards from the back-plate to overhang the fixed, non-rotatable housing. Thus, any tangential movement of the lining during a brake application will be resisted by the guide plates resting against the housing. To remove the lining subassembly from the brake during the relining operation, one of the guide plates is detached from its back-plate by removing the screws holding it in position and pulling the guide plate laterally away from the back-plate. The lining subassembly then carried on the back-plate can be removed by sliding it laterally parallel to the face of the disc.

---

It is well known that the need to replace brake linings as wear occurs which can be accomplished without disassembly of the entire brake assembly or housing is much needed by the art today to facilitate repairs, and eliminate or reduce service costs.

The invention relates to disc brakes, and more particularly to a construction whereby the linings may be readily replaced when worn without disassembly of the total brake structure. This is accomplished by providing a disc brake comprising a rotatable disc, a pair of friction elements, one on each side of said disc in substantially opposed relation and covering only a portion of the braking surfaces of said disc, each element being movable to and from the opposed face of the disc, a non-rotatable bracket comprising a portion adjacent to and extending over a limited length of the periphery of the disc, on both sides thereof and which is characterized by separate plate means mounted to each friction element of such shape so as to engage the bracket on opposed ends of the element to prevent movement of the elements parallel to the plane of the disc, which elements further form a guide for movement of each pad to and from its opposed face of the disc, whereby at least one of the plate means on each element is removable to permit withdrawal of the element in a direction parallel to the face of the disc.

For a better understanding of the invention reference should be had to the accompanying drawings wherein.

Figure 1:
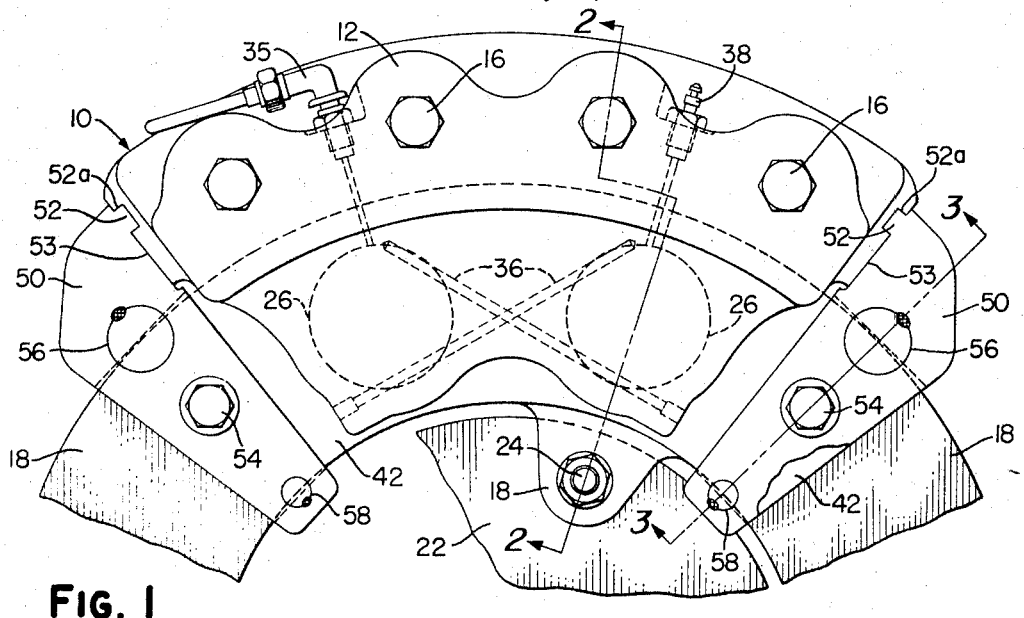
FIG. 1 is an enlarged, broken-away elevational view of a disc brake incorporating the preferred embodiment of the invention.

With reference to the form of the invention illustrated in the drawings, the numeral 10 illustrates generally a non-rotatable disc brake bracket or housing comprised of symmetrical halves 12 and 14 held together by a plurality of appropriate bolt means 16. The housing or bracket 10 is preferably mounted in fixed relationship to a rotating brake disc 18 by a suitable torque plate 20. Each of the bracket halves 12 and 14 has a portion adjacent to or extending over a limited length of the periphery of the disc 18. The actual fixed mounting of the torque plate is normally in relation to the axle, and is not illustrated as it is substantially conventional. In the usual manner, the brake disc 18 is fixedly mounted to a rotatable wheel 22 by a suitable bolt 24, although other conventional drives of the brake disc in association with the wheel can be provided. Normally, while the disc 18 will be fixed with the wheel 22, it could be made slidable axially relative to the wheel.

Figure 2:
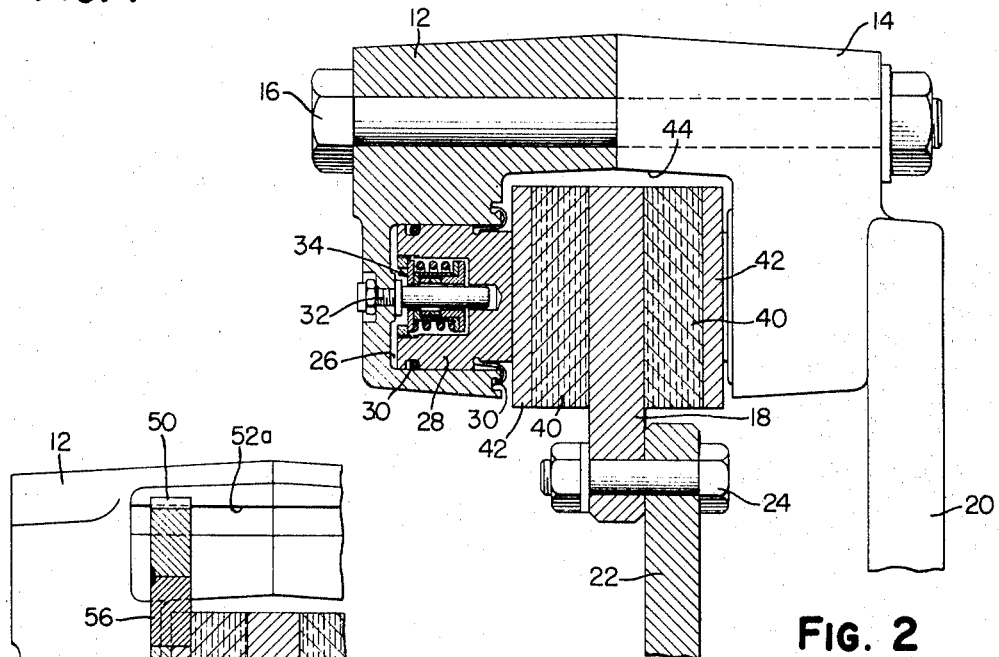
FIG. 2 is a broken-away, cross-sectional illustration taken on line 2—2 of FIG. 1.

In the embodiment of the invention illustrated, and as best seen in FIG. 2 of the drawings, each of the halves 12 and 14 of the bracket 10 has double opposed hydraulic pressure cylinders 26, each of which carries a respective pressure piston 28. Appropriate rubber seals 30 are provided to insure a hydraulic seal. A centering post 32 and reset spring mechanism, indicated generally by numeral 34, are associated with each of the pistons. In order to provide hydraulic pressure to the cylinders behind the pistons, an appropriate inlet fitting 35 is provided with passages, indicated by dotted lines 36 in FIG. 1, connecting the respective pairs of pistons on each side of the housing, all in a manner well known in the art. A bleeder 38 is provided to insure a complete filling of the hydraulic system, again in the usual manner known in the art.

The characterizing features of the invention are provided by a brake lining 40 being associated with each respective piston, and attached to a steel, or other suitable composition, back-plate 42. The back-plate 42 is continuous around the brake and rests against the pressure surface of the respective pistons 28. In other words, the lining-back-plate subassembly is not fastened to the pistons. The back-plate 42 extends arcuately through a recessed portion 44 associated with each housing half 12 and 14, again as best seen in FIG. 2, and laterally beyond the edges of the housing 10, as best seen in FIG. 1. In effect, the base plate 42 is substantially of the same radial width as the brake disc 18, although this is not critical to the proper operation of the brake as more fully described below. Also, it should be understood that the lining 40 and back-plate 42 normally are an integral unit which could be identified as a friction element. In certain special situations the friction element might be one material or composition throughout, whereas in the usual situation the back-plate 42 will be of metal for strength and the lining 40 of a suitable friction material bonded to the plate 42.

In order to position each of the back-plates 42 with respect to the housing 10 both in an arcuate and a radial direction, so as to insure proper positioning of the friction material 40 with respect to the pistons actuating the brake disc 18, at substantially opposed ends of each of the back-plates is attached a removable stop or guide plate 50 that extends radially outwardly from the respective back-plate and has a tab or key 52 which interlocks or mates with an appropriate slot 52a in the respective half of the bracket 10. Thus, it should be understood that any tangential movement of the friction material 40 during a brake application will be resisted by one of the removable guide plates resting against its lateral or side end against a guide plate fixed to the bracket 10, dependent upon the direction of rotation of disc 18. Further, the interlocking engagement of key 52 with the housing resists any radial movement of the plate 42 or the friction materials 40. It should be understood, however, that the keys 52 and other bearing surfaces of the guide plates 50 are slidable in the bracket substantially perpendicular to the face of the disc 18 so as to form a guide for the friction material 40 upon actuation of the pistons 28. The guide plates 50 are removably positioned with respect to the back-plates 42 by appropriate hex-head cap screws 54, as best shown in FIGS. 1 and 3.

Figure 3:
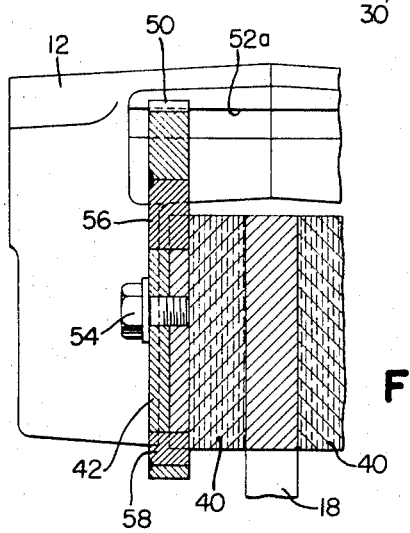
FIG. 3 is a cross-sectional illustration showing the mounting relationship of the plate means to the lining-back-plate as taken on line 3—3 of FIG. 1.

The actual structure of the guide plates 50 is best shown in FIG. 3. In essence, the positioning of the plates 50 with respect to the back-plates 42 is achieved by utilizing circular locking keys 56 and 58 at the radially inner and outer edges of the back-plates 42. The radial inner and radial outer end surfaces of the back-plates 42 are cut with half-moon-shaped slots of the same radius as the circular keys 56 and 58. The keys 56 and 58 are welded to the respective guide plates 50, and simply drop down into or seat in engagement with the back-plate 42, as clearly shown in FIG. 3, during assembly. Thus, the guide plate 50 is held in proper position with respect to back-plate 42 so that key 52 engages with the housing, and the relatively long or large surface 53 also comes into substantially flush engagement with the corresponding surface on the respective half of the bracket 10. Naturally, with both guide plates 50 on either end of the respective back-plates 42 in place and secured into position with the hex nut 54, the back-plate 42 is held in radial and lateral position with respect to the bracket 10 although it is slidable axially. It is contemplated that there will be a few thousandths of an inch play between the bracket 10 and the engaging surfaces of the guide plate 50 so as to facilitate positioning of the guide plates onto the back-plates 42 and the axially slidable engagement with the housing 10. However, it should be understood that the guide plates 50 act to retain the back-plates 42 in position for radial and lateral or tangential movement parallel to the face of disc 18 upon application of pressure to the pistons by engaging with a respective end surface of the bracket 10.

To remove the lining subassembly from the brake during the relining operation, either one of the two guide plates 50 associated with each back-plate 42 is detached by removing its hex-head cap screw 54 and pulling the guide plate laterally away from the back-plate to disengage the circular keys 56 and 58. The lining subassembly can then be removed circumferentially from the brake in the direction parallel to the face of disc 18 away from where the respective guide plate was removed since this end of the back-plate 42 is no longer restrained against housing 10 by the guide plate.

What is claimed is:

1. A disc brake comprising a rotatable disc, a non-rotatable bracket located adjacent the outer periphery of the disc, a brake housing mounted to the bracket and extending radially inwardly from the bracket on each side of the disc, a pad of friction material on each side of the disc, each slidably carried by the housing, a brake actuating mechanism for each pad positioned to press each associated pad toward the adjacent side of said disc, and a mounting member for each pad positioned between the pad and the brake actuating mechanism which is characterized by guide means mounted to each mounting member and engaging the brake housing slidably in a direction substantially normal to the face of the disc, but preventing movement of the mounting member from movement parallel to the face of the disc whereby said guide means are removable to permit withdrawl of said mounting member from the housing in a direction substantially parallel to the face of said disc.

2. A disc brake comprising a rotatable disc, a pair of friction elements, one on each side of said disc in substantially opposed relation and covering only a portion of the braking surfaces of said disc, each said element being movable to and from the opposed face of the disc, a non-rotatable bracket comprising a portion adjacent to and extending over a limited length of the periphery of the disc on both sides thereof, which is characterized by metallic back plates mounted to each respective friction element, and separate guide plate means mounted to each back-plate and being of such shape so as to slidably engage said bracket to form a guide for movement of each element to and from its opposed face of the disc but prevent movement of said elements parallel to the face of the disc, whereby said guide plate means on each back-plate are removable to permit withdrawal of said elements in a direction parallel to the face of the disc.

3. A disc brake according to claim 2 where two guide plate means are associated with each back-plate and mounted on opposed ends thereof, and whereby at least one of said guide plate means is removably mounted.

4. A disc brake according to claim 2 which includes key means associated with the guide plate means and engaging in sliding mating relation with a respective end of the bracket to provide proper radial positioning of the friction elements with respect to the disc, and to transmit pressures received by the friction elements through the back-plate, and the plate means to the bracket.

5. A disc brake according to claim 2 where the engagement of said guide plate means with the bracket also prevents the radial movement of the friction elements with respect to the rotatable disc.

6. A disc brake according to claim 5 which includes alignment means associated with the plate means and mating with the back-plates to insure proper positioning of the plate means on the opposed ends of the friction elements.

7. A disc brake comprising a rotatable disc, a friction element on one side of said disc and covering only a portion of the braking surface of said disc, said element being movable to and from the face of the disc, a non-rotatable bracket comprising a portion adjacent to and extending over a limited length of the periphery of the disc, and which is characterized by a metallic back-plate mounted to each friction element, and a guide plate means mounted to each back-plate each being of such shape to slidably engage said bracket and form a guide for movement of said elements to and from the face of the disc, but prevent movement of said element parallel to the face of the disc whereby said guide means on said back-plate is removable to permit withdrawal of said element from said bracket in a direction parallel to the face of the disc.

8. A disc brake according to claim 7 where two guide plate means are associated with said back-plate and mounted on opposed ends thereof, to slidably engage with opposed ends of the bracket and wherein at least one of said guide plate means is removably mounted.

References Cited
UNITED STATES PATENTS

| | | | |
|---|---|---|---|
| 2,942,695 | 6/1960 | Butler | 188—73 |
| 2,981,376 | 4/1961 | Zeidler | 188—73 |
| 3,186,517 | 6/1965 | Harrison | 188—73 |

GEORGE E. A. HALVOSA, *Primary Examiner.*

U.S. Cl. X.R.

188—250